US011922384B2

(12) United States Patent
Filipiak et al.

(10) Patent No.: US 11,922,384 B2
(45) Date of Patent: Mar. 5, 2024

(54) METHOD FOR OBTAINING A SECURITY TOKEN BY A MOBILE TERMINAL

(71) Applicant: Orange, Paris (FR)

(72) Inventors: Alicia Filipiak, Paris (FR); Saïd Gharout, Paris (FR); Jacques Traore, Saint Georges des Groseillers (FR); Véronique Cortier, Vandoeuvre les Nancy (FR)

(73) Assignee: ORANGE, Issy-les-Moulineaux (FR)

( * ) Notice: Subject to any disclaimer, the term of this patent is extended or adjusted under 35 U.S.C. 154(b) by 1317 days.

(21) Appl. No.: 16/094,443

(22) PCT Filed: Apr. 14, 2017

(86) PCT No.: PCT/FR2017/050910
§ 371 (c)(1),
(2) Date: Oct. 17, 2018

(87) PCT Pub. No.: WO2017/182747
PCT Pub. Date: Oct. 26, 2017

(65) Prior Publication Data
US 2019/0122191 A1 Apr. 25, 2019

(30) Foreign Application Priority Data

Apr. 18, 2016 (FR) ...................... 1653410

(51) Int. Cl.
*G06Q 20/32* (2012.01)
*G06Q 20/12* (2012.01)
(Continued)

(52) U.S. Cl.
CPC ........... *G06Q 20/12* (2013.01); *G06Q 20/204* (2013.01); *G06Q 20/3223* (2013.01);
(Continued)

(58) Field of Classification Search
CPC .. G06Q 20/12; G06Q 20/204; G06Q 20/3223; G06Q 20/3229; G06Q 20/3823;
(Continued)

(56) References Cited

U.S. PATENT DOCUMENTS 6,307,940 B1 * 10/2001 Yamamoto ............ H04L 9/0662
380/44
7,222,361 B2 * 5/2007 Kemper .................. G06F 21/31
713/168

(Continued)

FOREIGN PATENT DOCUMENTS

GB 2 525 426 A 10/2015

OTHER PUBLICATIONS

V. Cortier, A. Filipiak, J. Florent, S. Gharout and J. Traoré, "Designing and Proving an EMV-Compliant Payment Protocol for Mobile Devices," 2017 IEEE European Symposium on Security and Privacy (EuroS&P), 2017, pp. 467-480, doi: 10.1109/EuroSP.2017.19.*

(Continued)

*Primary Examiner* — Steven S Kim
(74) *Attorney, Agent, or Firm* — Knobbe, Martens, Olson & Bear, LLP

(57) ABSTRACT

The method of the invention comprises:
an identification step (E30-E50) of identifying the user of the mobile terminal;
a generation step, triggered if identification is successful, of a secure element of the terminal generating (E70) at least one identification value for the terminal by using a first secret key shared between the secure element and a token service provider device;
a sending step (E100) of sending a request to the token service provider device to obtain at least one security token, the request including said at least one identification value for the terminal; and
(Continued)

a reception step (F90) of receiving from the token service provider device said at least one security token in encrypted form, each security token being associated with a random number generated by the token service provider device and being encrypted by means of an encryption key generated for that token from the random number and from a second secret key shared between the token service provider device and the secure element of the terminal.

10 Claims, 6 Drawing Sheets

(51) Int. Cl.
  *G06Q 20/20* (2012.01)
  *G06Q 20/38* (2012.01)
  *G06Q 20/40* (2012.01)
  *H04L 9/32* (2006.01)

(52) U.S. Cl.
  CPC ..... *G06Q 20/3229* (2013.01); *G06Q 20/3823* (2013.01); *G06Q 20/3825* (2013.01); *G06Q 20/3829* (2013.01); *G06Q 20/383* (2013.01); *G06Q 20/385* (2013.01); *G06Q 20/4012* (2013.01); *G06Q 20/4014* (2013.01); *H04L 9/3213* (2013.01); *H04L 9/3234* (2013.01); *H04L 9/3242* (2013.01)

(58) Field of Classification Search
  CPC .......... G06Q 20/3825; G06Q 20/3829; G06Q 20/383; G06Q 20/385; G06Q 20/4012
  See application file for complete search history.

(56) References Cited

U.S. PATENT DOCUMENTS

| | | | |
|---|---|---|---|
| 8,312,519 B1* | 11/2012 | Bailey | H04L 9/3234 713/168 |
| 9,419,841 B1* | 8/2016 | Kozolchyk | H04L 9/3239 |
| 10,762,499 B2* | 9/2020 | Taratine | G06Q 20/3224 |
| 2001/0052070 A1* | 12/2001 | Oishi | H04L 63/14 713/189 |
| 2008/0130881 A1* | 6/2008 | You | H04L 9/0637 380/46 |
| 2009/0307142 A1* | 12/2009 | Mardikar | H04W 4/80 705/72 |
| 2012/0130839 A1* | 5/2012 | Koh | G06Q 20/3552 705/26.1 |
| 2012/0143706 A1* | 6/2012 | Crake | G06Q 20/3227 705/18 |
| 2012/0150742 A1* | 6/2012 | Poon | G06Q 20/40 705/44 |
| 2013/0212666 A1* | 8/2013 | Mattsson | G06Q 20/385 726/9 |
| 2013/0305352 A1* | 11/2013 | Narendra | H04M 1/673 726/19 |
| 2013/0339166 A1* | 12/2013 | Baer | G06Q 20/3278 705/16 |
| 2014/0068722 A1* | 3/2014 | Hayat | H04W 12/084 726/4 |
| 2015/0172283 A1 | 6/2015 | Omnes et al. | |
| 2015/0262170 A1* | 9/2015 | Bouda | G06Q 20/322 705/67 |
| 2015/0312038 A1 | 10/2015 | Palanisamy | |
| 2015/0356560 A1* | 12/2015 | Shastry | G06Q 20/401 705/64 |
| 2016/0110711 A1* | 4/2016 | Collinge | H04L 63/083 705/71 |
| 2016/0119334 A1* | 4/2016 | Chai | H04L 9/0897 726/3 |
| 2016/0253651 A1* | 9/2016 | Park | G06Q 20/34 705/39 |
| 2018/0165673 A1* | 6/2018 | Francis | G06Q 20/3278 |
| 2018/0288031 A1* | 10/2018 | Kumar | H04L 63/0807 |

OTHER PUBLICATIONS

B. Schneier, "Applied Cryptography", John Wiley & Sons, Inc, 1996.*

Antunes Diogo et al, "NFC4Sure: Mobile ticketing system", 2016 Second International Conference on Mobile and Secure Services (Mobisecserv), Feb. 26, 2016, pp. 1-5.

Urien Pascal, "Towards Token-Requestor for ePayment based on Cloud of Secure Elements and HCE mobiles". 2015 First Conference on Mobile and Secure Services (Mobisecserv), Feb. 20, 2015.

"Payment Tokenisation Specification Technical Framework", Mar. 31, 2014, Retrieved from the Internet: URL:https://www.emvco.com/specifications.aspx?id=263, retrieved on Jun. 5, 2015.

International Search Report and Written Opinion dated Jul. 25, 2017 for International Application No. PCT/FR2017/050910.

* cited by examiner

METHOD FOR OBTAINING A SECURITY TOKEN BY A MOBILE TERMINAL

CROSS-REFERENCE TO RELATED APPLICATIONS

This application is the U.S. National Phase of International Application No. PCT/FR2017/050910 entitled METHOD FOR OBTAINING A SECURITY TOKEN BY A MOBILE TERMINAL, filed Apr. 14, 2017 and published on Oct. 26, 2017 as WO 2017/182747, which claims priority to French Patent Application No. 1653410, filed Apr. 18, 2016, each of which is hereby incorporated by reference in its entirety.

BACKGROUND OF THE INVENTION

The invention relates to the general field of making electronic transactions over a telecommunications network secure.

The invention relates more particularly to generating and using security tokens in order to provide security for electronic transactions performed over a telecommunications network. The term "electronic transaction" is used herein to mean any type of exchange between two or more devices over a telecommunications network (which telecommunications network may itself be constituted by one or more subnetworks). Such an electronic transaction may in particular be a purchase made on the Internet from a commercial site and comprising an electronic payment operation, a transfer of money, access to content, etc. Specifically, the electronic transactions of interest herein are those in which one of the parties to the transaction is a user's mobile terminal.

The invention thus has a preferred, but non-limiting application in the context of electronic payment transactions with a commercial device or site via a mobile terminal.

Unlike a proximity payment, where the bearer of a bank card inserts the card into a payment terminal, payment of electronic transactions over the Internet or via a mobile terminal presents a certain number of dangers: the data exchanged during the payment is specifically more easily accessible and interceptable, and as a result is more likely to be used in fraudulent manner by malicious persons.

Generating tokens and then using them, also known as "tokenization", provides a solution to that problem by setting out to substitute certain sensitive data (such as for example bank data e.g. a bank card number or a bank account number) exchanged during electronic transactions by means of security tokens or tokens generated for this purpose by a trusted entity referred to as a "token service provider". The token service provider is in charge of managing security tokens that are temporary and "neutral", in the sense that they are independent of the sensitive data they replace, being suitable for use during electronic transactions, and also of storing the link between such a token and the sensitive user data needed for executing the transaction.

The EMV® bank card payment standard as defined by the EMVCo consortium including in particular the EuroCard, MasterCard, Visa, and American Express companies, specifies, in the document entitled "EMV® payment tokenization specification", Version 1.0, March 2014, a general technical framework for performing tokenization in the context of an electric payment by bank card.

Present mobile terminal payment applications all rely on the EMV® standard, as adapted to a mobile context. Such applications are mostly proprietary and they implement the EMV® protocol end-to-end using a secure element of the mobile terminal. The term "secure element" is used herein to mean an element that is inviolable, i.e. that is "tamper-resistant" in the meaning of the GlobalPlatform standard, and is capable of hosting applications in secure manner and/or of storing confidential and sensitive data such as cryptographic data or other private and/or secret encryption keys, in secure manner. By way of example, such a secure element is a secure digital (SD) memory card or a microSD card, a universal integrated circuit card (UICC), e.g. such as a subscriber identity module (SIM) card, etc.

Implementing the EMV® protocol end-to-end using a secure element of the mobile terminal such as its UICC card does not take account of the environment in which the secure element is located. Specifically, unlike the chip of a bank card that is included on a passive medium, the secure element of a mobile terminal is located in an environment that is more vulnerable, since it is connected in almost continuous and permanent manner to a telecommunications network.

Furthermore, the present trend in mobile terminals is to open up access to the secure element from the operating system of the mobile terminal, thereby increasing the potential for attacks by a malicious agent (e.g. via malware or a virus installed in the operating system of the mobile terminal).

Unfortunately, executing in such an environment a protocol that was initially designed for an environment that is less vulnerable to attacks, such as a passive environment, is not without consequences for the security of electronic transactions. In addition, it should be observed that the EMVCo consortium defines only a technical framework for performing the EMV® protocol, but without imposing details as to its implementation.

OBJECT AND SUMMARY OF THE INVENTION

The invention serves in particular to mitigate the drawbacks of the state-of-the-art by proposing a mechanism that is safe and reliable for providing security tokens that are to be used by a mobile terminal during electronic transactions over a telecommunications network as substitutes for sensitive data relating to that user (e.g. bank data). The mechanism relies on a link of trust set up between a secure element of the mobile terminal, considered to be inviolable, and a token service provider device, likewise considered to be a trusted entity. It comprises various operations performed within the mobile terminal, some of which are implemented by the mobile terminal secure element itself and are protected by identifying the user of the terminal, and also operations that are performed by the token service provider device.

More particularly, the invention provides an obtaining method of a user's mobile terminal obtaining at least one security token for use during an electronic transaction, the method comprising:

an identification step of identifying the user of the mobile terminal;

a generation step, triggered if the user is successfully identified, of a secure element of the mobile terminal generating at least one identification value for the mobile terminal by using a first secret key shared between the secure element and a token service provider device;

a sending step of sending a request to the token service provider device to obtain at least one security token for use by the mobile terminal during an electronic transaction, the request including said at least one identification value for the mobile terminal; and a reception step of receiving from the token service provider device said at least one security token in encrypted form, each security token being associated with a random number generated by the token service provider device and being encrypted by means of an encryption key generated for that security token from the random number and from a second secret key shared between the token service provider device and the secure element of the mobile terminal.

It should be observed that with the exception of the generation step, the various steps mentioned above can be performed by an application of the mobile terminal and/or by a trusted execution environment, which need not necessarily be included in the secure element. Thus, by way of example, the step of sending the request for obtaining security tokens and the step of receiving the tokens can be implemented by a mobile application hosted by the mobile terminal, while a trusted execution environment, preferably isolated from the operating system of the mobile terminal, can manage identifying the user of the terminal in secure manner. Such identification may involve various means and interfaces, for example the user inputting a personal identification number (PIN) code, and or capturing a fingerprint of the user via a sensor forming part of the mobile terminal, or indeed inputting an identifier and a password, etc.

Correspondingly, the invention also provides a mobile terminal comprising:

a secure element;

an identification module configured to identify a user of the mobile terminal;

a generator module included in the secure element and activated if the identification module identifies the user successfully, the generator module being configured for generating at least one identification value for the mobile terminal by using a first secret key shared between the secure element and a token service provider device;

a send module configured for sending a request to the token service provider device to obtain at least one security token for use by the mobile terminal during an electronic transaction, the request including said at least one identification value for the mobile terminal; and a reception module suitable for receiving from the token service provider device said at least one security token in encrypted form, each security token being associated with a random number generated by the token service provider device and encrypted by means of an encryption key generated for the security token from the random number and from a second secret key shared between the token service provider device and the secure element of the mobile terminal.

It should be observed that execution of the obtaining method of the invention is not necessarily correlated with executing an electronic transaction. It may be performed beforehand, even before the mobile terminal participates in any such transaction. The method of the invention specifically enables the mobile terminal to obtain one or more security tokens prior to any electronic transaction, which tokens can be used subsequently as required. The invention thus enables time to be saved during the execution of electronic transactions.

Preferably, each security token can be used for only one electronic transaction. This makes it possible to limit the negative consequences that could result from such a token being intercepted by a malicious entity.

Advantageously, the security tokens obtained by the mobile terminal are encrypted by the token service provider device before they are transmitted to the mobile terminal, and then they are stored therein in this encrypted form. In a preferred implementation, during the storage step, said at least one encrypted security token and the associated random number are stored outside the secure element of the mobile terminal, e.g. within the operating system of the mobile terminal. This simplifies access by the mobile terminal to the security tokens that have been obtained and reduces the load on the resources of the secure element. Furthermore, this makes the method easier to implement. It is nevertheless guaranteed that the security tokens are protected within the mobile terminal because they have been encrypted by an encryption key that is specific to each token and that is generated by the token service provider device on the basis of a secret shared only with the secure element of the mobile terminal (second secret key in the meaning of the invention). In other words, the secure element of the mobile terminal, which is considered to be inviolable, is capable of generating the encryption keys that are used for encrypting the security tokens and that also enable them to be decrypted for use. The invention thus provides a security guarantee that is strong and formal.

In addition, the mobile terminal can advantageously obtain security tokens only on the condition of the user of the terminal being identified. In accordance with the invention, it is only on this condition that the secure element of the mobile terminal is activated to generate one or more identification values for the terminal, which enable it to obtain security tokens from the token service provider device. Specifically, these identification values form an integral portion of the request sent by the mobile terminal to the token service provider device in order to obtain the security tokens. They also make it possible to guarantee to the token service provider device that the user of the terminal has indeed been identified prior to the request being sent.

Thus, since security tokens can be obtained by the mobile terminal only as a result of the user of the mobile terminal being validly identified, it is ensured that even if a malicious entity were to obtain and decrypt the security tokens generated for the mobile terminal, the resulting fraudulent use would be limited to those tokens: in other words, the number of electronic transactions in which the malicious entity might be able to participate cannot exceed the number of tokens available in the mobile terminal.

In a particular implementation, said at least one identification value generated by the secure element comprises:

a count maintained by the secure element, the count corresponding to the number of requests to obtain at least one token that have been sent by the terminal to the token service provider device; and a hash generated by applying a hashing function to the count and to the first secret key.

Since the first secret key is shared only between the token service provider device and the secure element of the mobile terminal, it is easy for the token service provider device to use the identification values that it receives in the request to make sure that the request was indeed sent from an authorized mobile terminal with which it shares a secret. This establishes a trusted link between the mobile terminal and the token service provider device.

Also, inserting a count with these identification values makes it easy, by appropriate verification being performed at the token service provider device, to limit any fraudulent use of such identification values, should they be intercepted by a malicious entity. Specifically, an equivalent count can be maintained by the token service provider device, thereby enabling it to check that the value of the count that it receives in the request is consistent with the value of the count it is maintaining for the mobile terminal. If not consistent, then the token service provider device can reject the request from the mobile terminal.

In a particular implementation, the obtaining method also includes, before the sending step, a step of encrypting the request by using a public key allocated to the token service provider device.

This makes it possible to further secure communications between the mobile terminal and the token service provider device, and to guard against an attack seeking to intercept the identification values for the mobile terminal that are sent in the request. Specifically, because of the asymmetric encryption performed by the mobile terminal, it is ensured that only the token service provider device is in a position to access the identification values for the mobile terminal.

In a variant, a secure communications channel between the mobile terminal and the token service provider device may be set up by any other means.

As mentioned above, the invention also relies on a security token service provider device being used by the mobile terminal after the user has been identified and for the method of generating security tokens that is performed by the device.

Thus, the invention also provides, in another aspect, a generation method performed by a token service provider device to generate at least one security token that is to be used by a mobile terminal during an electronic transaction, said generation method comprising:
  a reception step of receiving from the mobile terminal a request to obtain at least one security token for use by the mobile terminal during an electronic transaction, the request including at least one identification value for the mobile terminal as generated by the secure element of the mobile terminal by using a first secret key shared between the secure element and the token provider;
  a verification step of verifying said at least one identification value by means of the first secret key;
  a generation step, triggered if said at least one identification value is valid, of generating for said mobile terminal said at least one security token and a random number associated with each token;
  a generation step of generating an encryption key for each security token from the random number associated with that token and from a second secret key shared between the token service provider device and the secure element of the mobile terminal;
  an encryption step of encrypting each security token by using the encryption key generated for that token; and
  a sending step of sending said at least one encrypted security token and the associated random number to the mobile terminal.

Correspondingly, the invention also provides a security token service provider device for use in electronic transactions, the device comprising:
  a reception module suitable for receiving from a mobile terminal a request to obtain at least one security token for use by the mobile terminal during an electronic transaction, the request including at least one identification value for the mobile terminal as generated by a secure element of the mobile terminal by using a first secret key shared between the secure element and the token service provider device;
  a first verification module configured for verifying said at least one identification value by means of the first secret key;
  a first generator module that is activated if said at least one identification value verified by the verification module is valid and that is configured for generating at least one security token and a random number associated with each token for the mobile terminal;
  a second generator module configured for generating an encryption key for each security token as generated by the first generator module from the random number associated with that token and from a second secret key shared between the token service provider device and the secure element of the mobile terminal;
  an encryption module configured for encrypting each security token by using the encryption key generated for that token; and
  a send module configured for sending said at least one encrypted security token and the associated random number to the mobile terminal.

The generation method and the token service provider device benefit from the same advantages as those mentioned above for the obtaining method and for the mobile terminal.

Specifically, the various steps performed serve to ensure that the security tokens obtained by the mobile terminal are indeed generated by a trusted entity, namely by the token service provider device with which the secure element of the mobile terminal shares various secret keys. Also, the steps are performed after the user has been identified and after verifying that the mobile terminal is indeed a terminal that is authorized to request such security tokens from the token service provider, by verifying the identification values it supplies in its request.

The security tokens are also encrypted by the token service provider device before they are transmitted to the mobile terminal so as to be stored therein in encrypted form. This encryption relies on a secret shared only between the token service provider device and the secure element of the mobile terminal. The security tokens can therefore be decrypted only by knowing this secret shared between the secure element of the mobile terminal and the token service provider device, and access to the secure element of the mobile terminal is permitted only via identification of the user of the mobile terminal.

By way of example, in a particular implementation, for each security token, the encryption key is generated by applying a hashing function to the random number associated with that token and to the second secret key shared between the secure element of the mobile terminal and the token service provider device.

Consequently, the invention as implemented by the mobile terminal and by the token service provider device offers a tokenization protocol that is particularly well adapted to the mobile environment. This protocol serves to limit the consequences of data stored on the mobile terminal being stolen or of the mobile terminal itself being stolen, and also the consequences of malicious interception of communications between the mobile terminal and the token service provider device.

In a particular implementation of the invention, said at least one encrypted security token and the associated random number are signed before they are sent to the mobile terminal by using a private encryption key allocated to the token service provider device.

As a result, it is not possible for a malicious entity to take the place of the token service provider device and provide the mobile terminal with security tokens. By verifying the signatures accompanying the security tokens that are transmitted thereto, the mobile terminal can specifically ensure that the tokens do indeed come from the token service provider device.

In a particular implementation, prior to being encrypted each token generated for the mobile terminal is included in a data packet that also includes an identifier of the mobile terminal and data specific to the user of the mobile terminal (e.g. bank data), this data packet then being signed by means of a private encryption key allocated to the token service provider device. For example, the data packet may comply with the EMV® standard.

The invention thus offers a tokenization protocol that is entirely compatible with the EMV® standard and that is transparent for commercial devices using that standard.

The invention relates to generating and obtaining security tokens (in other words tokenization), and also to the use properly speaking of such security tokens in electronic transactions.

Thus, in another aspect, the invention also provides a processing method for enabling a user's mobile terminal that includes a secure element to process a request relating to an electronic transaction, the processing method comprising:

an identification step, triggered on receiving a predetermined request coming from a third-party device and relating to an electronic transaction, of identifying the user of the mobile terminal;

a selection step, triggered if the user is successfully identified, of selecting a security token from at least one encrypted security token stored in the mobile terminal and obtained from a token service provider device in accordance with an obtaining method of the invention, the selected token being associated with a random number;

a generation step of the secure element of the mobile terminal generating for the selected token an encryption key from the random number associated with the token and from the second secret key shared between the token service provider device and the secure element, and used during the obtaining method;

a decryption step of decrypting the selected token by means of the encryption key that has been generated; and a sending step of sending a response including the decrypted token to the request from the third-party device.

Correspondingly, in this aspect of the invention, the identification module of the mobile terminal is also activated on receiving a predetermined request coming from a third-party device and relating to an electronic transaction, and the mobile terminal further comprises:

a selection module that is activated if the identification module identifies the user successfully and that is configured to select a security token from among said at least one encrypted security token stored in the mobile terminal;

a generator module included in the secure element of the mobile terminal and configured to generate an encryption key for the selected security token from the random number associated with the token and from the second secret key shared between the token service provider device and the secure element;

a decryption module configured for decrypting the selected security token by means of the encryption key that has been generated; and a send module configured for sending a response including the decrypted security token to the request from the third-party device.

The security token is not necessarily decrypted by the secure element, in order to avoid overloading it. The decryption operation may be performed in particular by a mobile application hosted by the mobile terminal.

As mentioned above, it should be observed that using a security token is not correlated with obtaining it. Also, during an electronic transaction, use of the token is protected, as was the process of obtaining it, by identifying the user of the terminal. Execution of the electronic transaction, which depends on the mobile terminal supplying the security token, is thus conditional on the user of the terminal being identified, which makes it possible to ensure that it is indeed the user of the mobile terminal, and thus an authorized user, who is originating the transaction.

In a particular implementation, during the generation step, the secure element of the mobile terminal also generates a signature element for the electronic transaction from an identifier of the third-party device, from data characteristic of the transaction as supplied by the third-party device (e.g. the transaction amount), from the random number associated with the security token, and from the second secret key, the signature element for the transaction being transmitted to the third-party device in the response to the request.

Use of this signature element, in particular by the third-party device and by the token service provider device, thus serves to reinforce the security of the electronic transaction. Also, it serves to restrict the use of the security token to a single electronic transaction that is characterized by the information contained in the signature element. This serves to limit the negative consequences that could stem from a malicious entity intercepting a security token generated for the mobile terminal.

In a particular implementation, the processing method also includes a step taking out of service on the mobile terminal the security token that was sent in the response to the request, with this step being triggered by the mobile terminal receiving confirmation from the third-party device that the security token has been used.

The security token can thus be used once only, i.e. for a single electronic transaction.

In another aspect, the invention provides a verification method for verifying a security token supplied by a user's mobile terminal to a third-party device during an electronic transaction, this validation method being for performing by a token service provider device that generated the token for the mobile terminal in accordance with a generation method of the invention, the verification method comprising:

a reception step of receiving a verification request including the token from the third-party device; and a verification step of verifying that the token included in the request was indeed generated by the token service provider device for the mobile terminal.

Correspondingly, in this aspect, the token service provider device of the invention comprises:

a second reception module suitable for receiving a verification request from a third-party device, the request including a security token supplied by the user's mobile terminal during an electronic transaction; and a second verification module configured to verify that the security token included in the request was indeed generated for the mobile terminal by the token service provider device.

In a particular implementation, the verification method further comprises a validation step for validating a signature element for the transaction included in the request, the signature element being generated from an identifier of the commercial device, from data characteristic of the transaction, from the random number associated with the security token, and from the second secret key used during the generation method and shared between the secure element of the mobile terminal and the token service provider device.

The verification method and the token service provider device in this aspect of the invention benefit from the same advantages as those mentioned above for the processing method and for the mobile terminal.

It should also be observed that the processing performed in accordance with the invention by the mobile terminal of the request coming from the third-party device, and the verification performed by the token service provider device are both compatible with the EMV® standard, such that the invention can be applied easily in electronic transactions including electronic payment via the mobile terminal.

In a particular implementation, the various steps of the obtaining method, of the generation method, of the processing method, and/or of the verification method are determined by computer program instructions.

Consequently, the invention also provides a computer program on a data medium, the program being suitable for being performed in a mobile terminal or more generally in a computer, the program including instructions adapted to perform steps of an obtaining method and/or processing method as described above.

The invention also provides a computer program on a data medium, the program being suitable for being performed in a token service provider (TSP) device or more generally in a computer, the program including instructions adapted to performing steps of a generation method and/or of a verification method as described above.

Each of these programs may use any programming language, and be in the form of source code, object code, or code intermediate between source code and object code, such as in a partially compiled form or in any other desirable form.

The invention also provides a data medium (or a recording medium) that is readable by a computer, and that includes instructions of a computer program as specified above.

The data or recording medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a hard disk.

Furthermore, the data or recording medium may be a transmissible medium such as an electrical or optical signal that can be conveyed via an electrical or optical cable, by radio, or by other means. The program of the invention may in particular the downloaded from a network of the Internet type.

Alternatively, the data or recording medium may be an integrated circuit in which the program is incorporated, the circuit being adapted to execute or to be used in the execution of the method in question.

The invention also provides a system comprising:
a security token service provider device of the invention;
a mobile terminal of the invention; and
a third-party device suitable for performing an electronic transaction with the mobile terminal;
the mobile terminal being configured to make use, during said electronic transaction with the third-party device, of a security token generated by the token service provider device.

As mentioned above, the electronic transaction may comprise in particular a payment operation and the security token is used by the mobile terminal during the payment operation.

In other implementations or embodiments, it is also possible to envisage that the obtaining method, the processing method, the generation method, the verification method, the mobile terminal, the token service provider device, and the system of the invention present in combination all or some of the above-mentioned characteristics.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
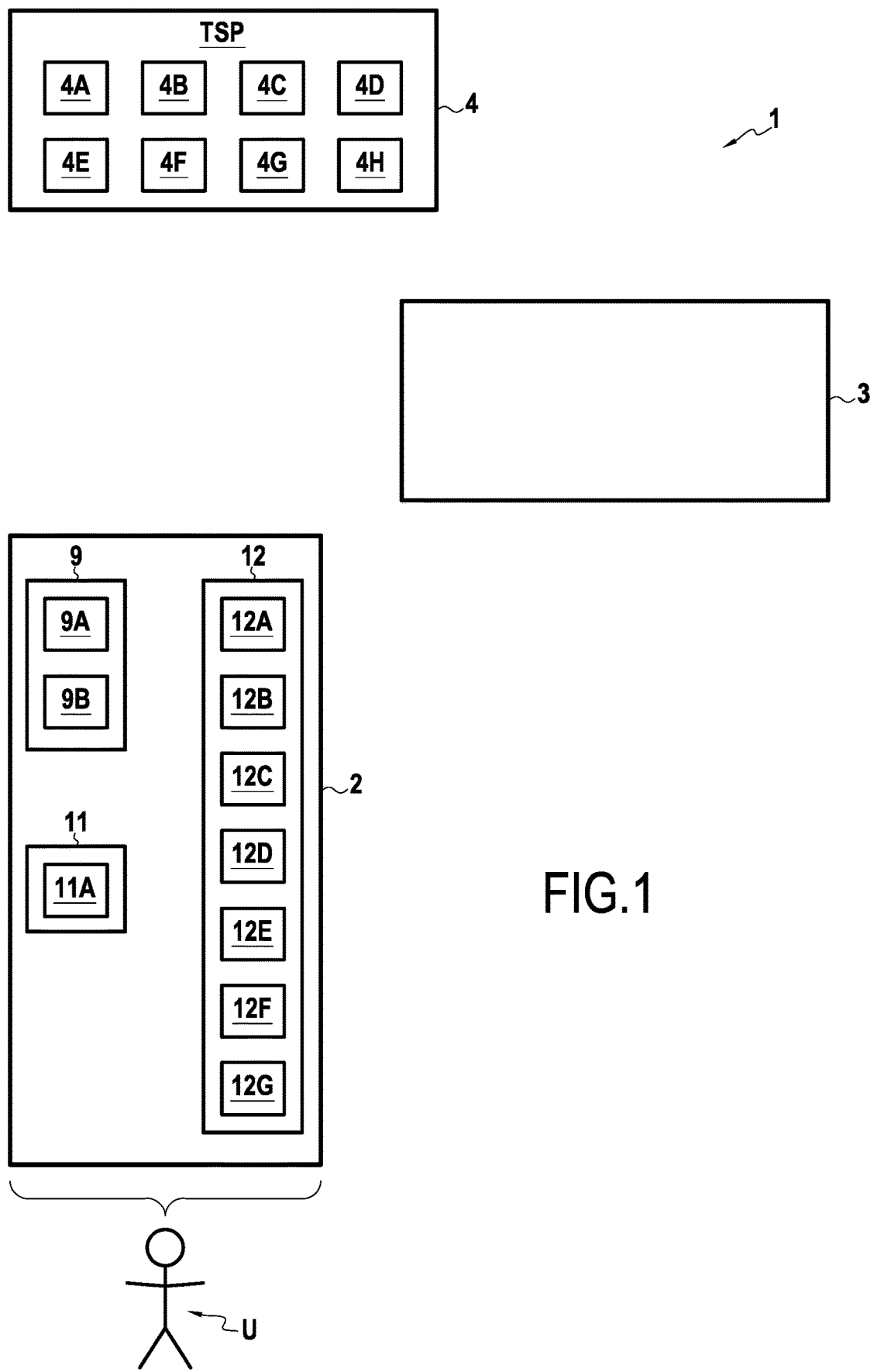
FIG. 1 is a diagram showing a system in accordance with the invention.

FIG. 1 shows, in its environment, and in a particular embodiment, a system 1 in accordance with the invention serving to supervise electronic transactions in a telecommunications network, such as for example the public Internet network.

No limitation is attached to the nature or the composition of the telecommunications network under consideration, which network may in particular potentially be made up of a plurality of subnetworks.

In the example shown in FIG. 1, consideration is given to an electronic transaction of the type in which a user U of a mobile terminal 2 in accordance with the invention purchases an article, which article is on sale at a web site hosted by a commercial device 3 (third party device in the meaning of the invention). The electronic transaction comprises an operation of the user U paying the commercial device 3 for the purchased article via the mobile terminal 2.

It is assumed that the underlying payment network making this payment operation possible complies with the specifications of the EMV® standard. In particular, the payment network manages such electronic transactions by performing a process in accordance with the invention for generating and using tokens, or "tokenization", and that is compatible with the technical framework imposed by the EMV® standard in the document (referred to below as D1) entitled "EMV® payment tokenization specification", version 1.0, March 2014, and published by the EMVCo consortium. Such a token takes the place of long-lasting sensitive data, such as a bank account number or a payment card number, in the context of electronic payment transactions. For this purpose, the tokenization process relies on the mobile terminal 2 and on the commercial device 3 of the system 1, and also on a token service provider (TSP) device 4 in accordance with the invention. The TSP device 4 forms part of the system 1 and is suitable for providing the mobile terminal 2 with security tokens that it can use during its electronic transactions, and in particular in the presently-described example during the operation of paying the commercial device 3 for the purchased article.

The payment network also has other entities that are not shown in FIG. 1, such as for example a banking organization managing the account of the user U.

It should be observed that these assumptions are not themselves limiting and that the invention applies to other types of electronic transactions (e.g. transferring money, etc.).

Furthermore, no limit is associated with the nature of the mobile telecommunications network to which the mobile terminal 2 is connected in order to communicate with the commercial device 3 and with the TSP device 4. By way of example, it may be a third or fourth generation (3G or 4G), etc. network.

Figure 2:
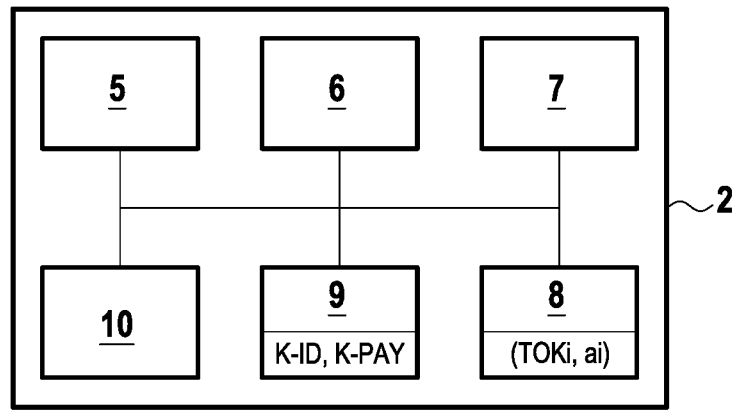
FIGS. 2 and 3 show the hardware architecture of a mobile terminal and of a token service provider device of the FIG. 1 system, in particular embodiments.

In the presently-described embodiment, the mobile terminal 2 has the hardware architecture of a computer, as shown diagrammatically in FIG. 2.

In particular, it comprises a processor 5, a random access memory (RAM) 6, a read only memory (ROM) 7, a non-volatile memory 8, a secure element 9 having a microprocessor and memories (e.g. ROM and RAM), and a communications module 10 enabling the mobile terminal 2 to communicate with the commercial device 3 and with the TSP device 4. The communications module 10 thus includes in particular transmit and receive antennas and enables the mobile terminal 2 to communicate over a mobile telecommunications network by using various applications and data stored in the secure element 9. By way of example, the secure element 9 is a UICC card.

In a variant, it could be any other secure element as defined by the GlobalPlatform standard, i.e. an element that is deemed to be inviolable and tamper-resistant. Such a secure element may for example be a secure SD card or a secure microSD card.

The ROM 7 of the mobile terminal 2 and the memory of the secure element 9 constitute data media in accordance with the invention that are readable respectively by the processor 5 and by the microprocessor of the secure element 9 and that store instructions of a computer program P2-1 of the invention including instructions for executing steps of an obtaining method of the invention, and a computer program P2-2 in accordance with the invention including instructions for executing steps of a processing method of the invention. The computer program P2-2 may be configured to call the program P2-1.

In equivalent manner, these computer programs define functional and software modules of the terminal 2 that are configured to perform the steps of the obtaining method and of the processing method of the invention. These functional modules rely on or control the hardware elements 5-10 of the mobile terminal 2. In the presently-described embodiment, they are distributed over three entities shown in FIG. 1, namely the secure element 9, a secure or "trusted" execution environment 11, and a mobile application 12. The trusted execution environment 11 provides the user U with a secure interface enabling the user to be identified via various means (e.g. inputting a PIN code or inputting an identifier and a password of the user via a virtual digital keyboard provided by the interface, capturing a tactile print or a fingerprint via an appropriate sensor provided on the mobile terminal 2, etc.).

In the presently-described embodiment, the trusted execution environment 11 complies with the definition by the GlobalPlatform standard. It is a secure zone of the processor 5 of the mobile terminal 2 that is completely isolated from the operating system of the mobile terminal 2 where mobile applications installed on the terminal are executed, and that offers a secure environment for execution and storage.

The various functional modules defined by the computer programs P2-1 and P2-2 in this example comprise in particular, and as shown in FIG. 1:

- an identification module 11A located in the trusted execution environment 11 and configured to identify the user U of the mobile terminal 2 on request from the mobile application 12;
- a first generator module 9A contained in the secure element 9 and activated if the user is successfully identified by the identification module 11A, the generator module being configured to generate at least one identification value for the mobile terminal by using a secret key K-ID (first secret key in the meaning of the invention) that is shared between the secure element 9 and the TSP device 4;
- a first send module 12A provided in the mobile application 12 and configured to send an obtaining request to the TSP device 4 in order to obtain a number N of security tokens that can be used by the mobile terminal during electronic transactions, where N is an integer greater than or equal to 1. The request as sent in this way contains the identification value(s) for the mobile terminal 2 as generated by the generator module 9A;
- a first reception module 12B provided in the mobile application 12 and suitable for receiving in encrypted manner the security token(s) from the TSP device 4 together with random numbers associated with the security tokens;
- a storage module 12C provided in the mobile application 12 and configured to store in the mobile terminal 2, e.g. in its non-volatile memory 8, the encrypted security token(s) received from the TSP device 4, together with their random numbers;
- a second reception module 12D provided in the mobile application 12 and suitable for receiving a request relating to an electronic transaction from a commercial device such as the commercial device 3, which request may be a payment request, for example;
- a selection module 12E, provided in the mobile application 12 and configured, after receiving such a request, to select a security token from among the encrypted tokens stored in the non-volatile memory 8 in order to use that token for the electronic transaction associated with the request;
- a second generator module 9B included in the secure element 9 of the mobile terminal 2 and configured to generate for the security token selected by the selection module 12E an encryption key from the random number associated with the token and from a secret key K-PAY (second secret key in the meaning of the invention) shared between the TSP device 4 and the secure element 9;
- a decryption module 12F configured in the mobile application 12 to decrypt the selected security token by means of the encryption key generated for the token by the second generator module 9B; and a second send module 12G configured to send a response including the decrypted security token to the request from the commercial device.

Figure 4:
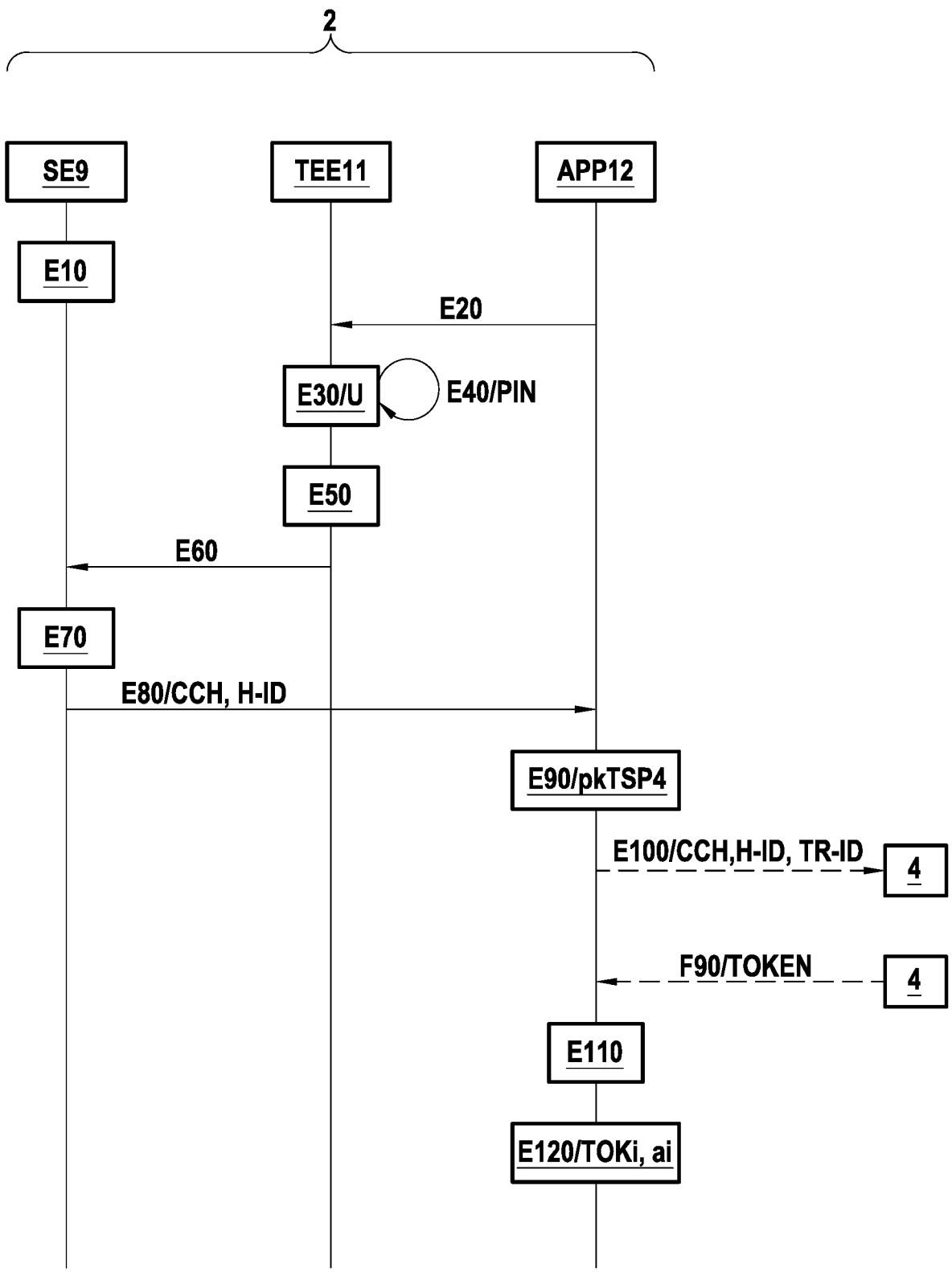
FIG. 4 shows the main steps of an obtaining method in accordance with the invention, as performed by the FIG. 2 mobile terminal.
Figure 7:
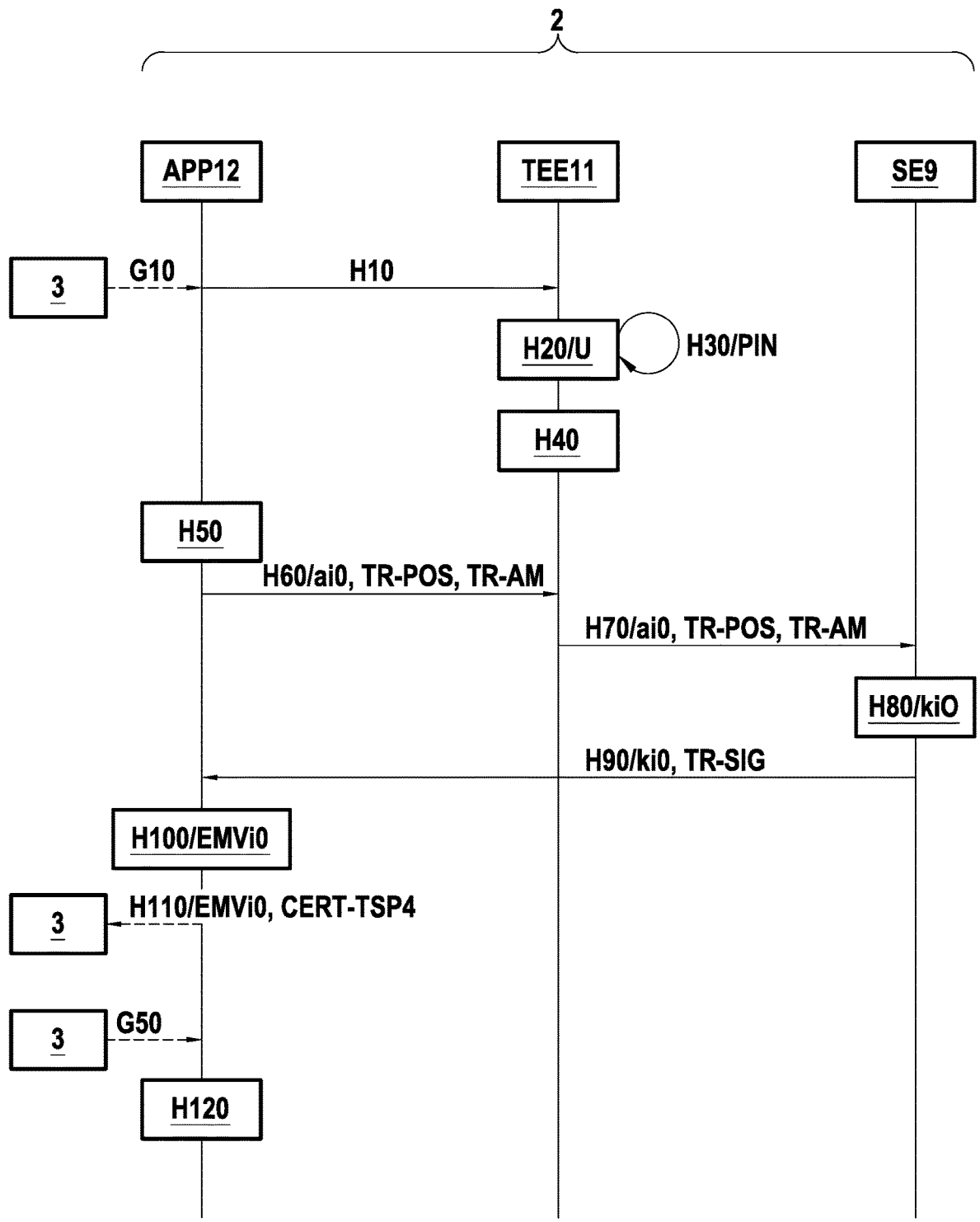
FIG. 7 shows the main steps of a processing method in accordance with the invention, as performed by the FIG. 2 mobile terminal, in a particular implementation.

It should be observed that the modules 11A, 9A, and 12A-12C are activated when provisioning security tokens for the mobile terminal 2. The modules 11A, 12D-12G, and 9B are activated during the electronic transaction. The functions of these various modules are described in greater detail below with reference to FIG. 4 showing the main steps of an obtaining method of the invention for obtaining security tokens and with reference to FIG. 7 showing the main steps of a processing method of the invention for processing a request relating to an electronic transaction.

Figure 3:
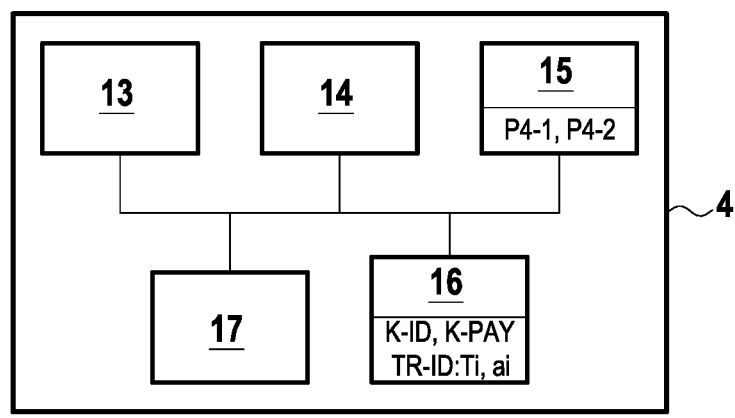

In similar manner, in the presently-described embodiment, the TSP device 4 has the hardware architecture of a computer, as shown diagrammatically in FIG. 3.

It comprises in particular a processor 13, a RAM 14, a ROM 15, a non-volatile memory 16, and a communications module 17 enabling the TSP device 4 to communicate in particular with the mobile terminal 2 and with the commercial device 3.

The ROM 15 of the TSP device 4 constitutes a data medium in accordance with the invention that is readable by the processor 13 of the device 4 and that stores computer programs P4-1 and P4-2 in accordance with the invention and including respectively instructions for executing steps of a method of the invention for generating security tokens and instructions for executing steps of a method of the invention for verifying a security token.

In equivalent manner, these computer programs define functional and software modules for the device 4 that are configured to perform the steps of the generation method and the verification method of the invention. These functional modules rely on or control the hardware elements 13-17 of the TSP device 4. In this example, they comprise in particular, and as shown in FIG. 1:

a first reception module 4A suitable for receiving from the mobile terminal 2 a request for obtaining a number N of security tokens suitable for use by the mobile terminal during electronic transactions, the request including at least one identification value for the terminal;

a first verification module 4B configured to verify the validity of the identification value(s) included in the request by means of the secret key K-ID;

a first generator module 4C that is activated if the identification values contained in the request are valid and configured to generate and store the N requested security tokens and respective random numbers associated with each token for the mobile terminal 2;

a second generator module 4D configured to generate an encryption key for each security token generated by the first generator module 4B using the random number associated with the token and the secret key K-PAY;

an encryption module 4E configured to encrypt each security token by using the encryption key generated for that token;

a send module 4F configured to send to the mobile terminal 2 the N encrypted security tokens and their associated random numbers;

a second reception module 4G suitable for receiving a verification request from a commercial device 3, which verification request includes a security token supplied by the user's mobile terminal 2 during an electronic transaction; and a second verification module 4H configured to verify that the security token included in the request was indeed generated for the mobile terminal 2 by the TSP device 4.

It should be observed that the TSP device 4 may include other modules that are not described in detail herein, making it possible to "detokenize" the received security token, i.e. to obtain sensitive data associated with the token and needed in order to execute the transaction, to interact with a transaction compensation organization such as a banking organization with which the user U is associated, etc., these modules themselves being known and complying with performing the EMV® protocol.

Furthermore, it may be observed that the modules 4A-4F are activated during provisioning of security tokens for the mobile terminal 2. The modules 4A, 4G, and 4H are activated during the electronic transaction. The functions of these various modules are described in greater detail below with reference to FIG. 5 showing the main steps of a generation method of the invention for generating security tokens and with reference to FIG. 6 showing the main steps of a verification method of the invention for verifying a security token.

As mentioned above, the invention serves advantageously for decorrelating generating security tokens for use by the mobile terminal 2 in order to perform electronic transactions, and actually using those security tokens.

Figure 5:
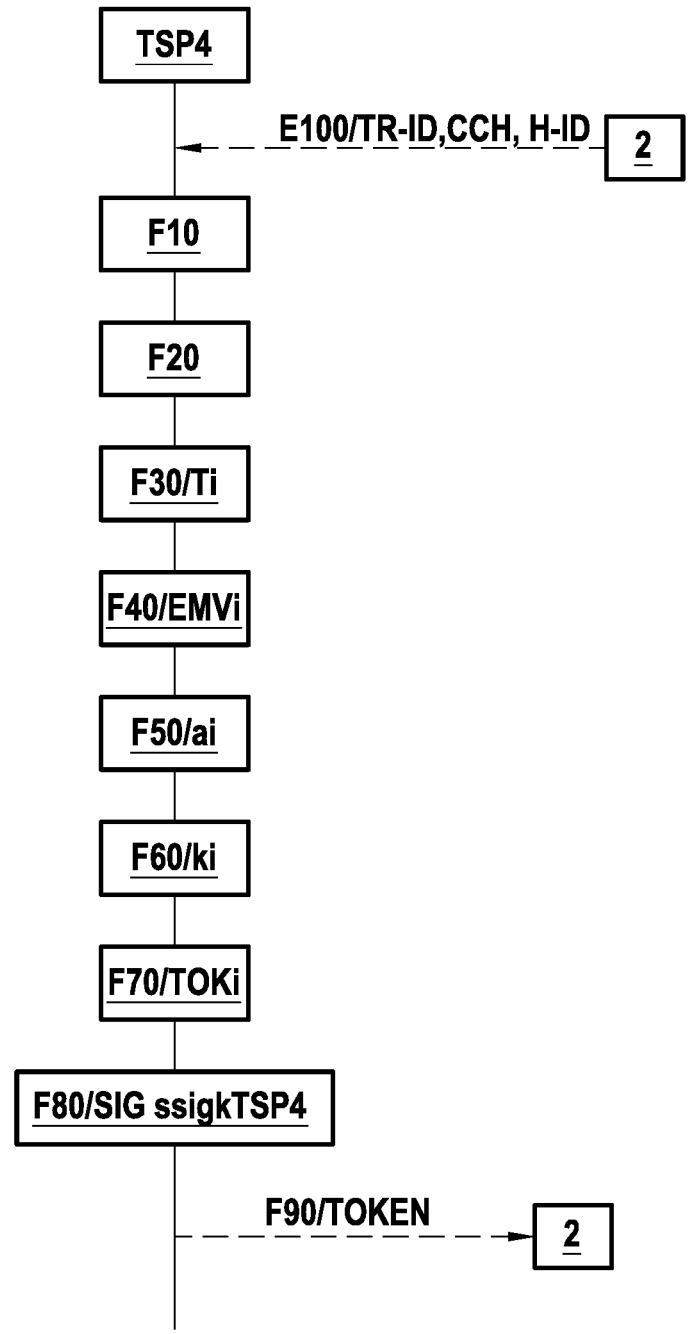
FIG. 5 shows the main steps of a generation method in accordance with the invention, as performed by the FIG. 3 token service provider device in a particular implementation.
Figure 6:
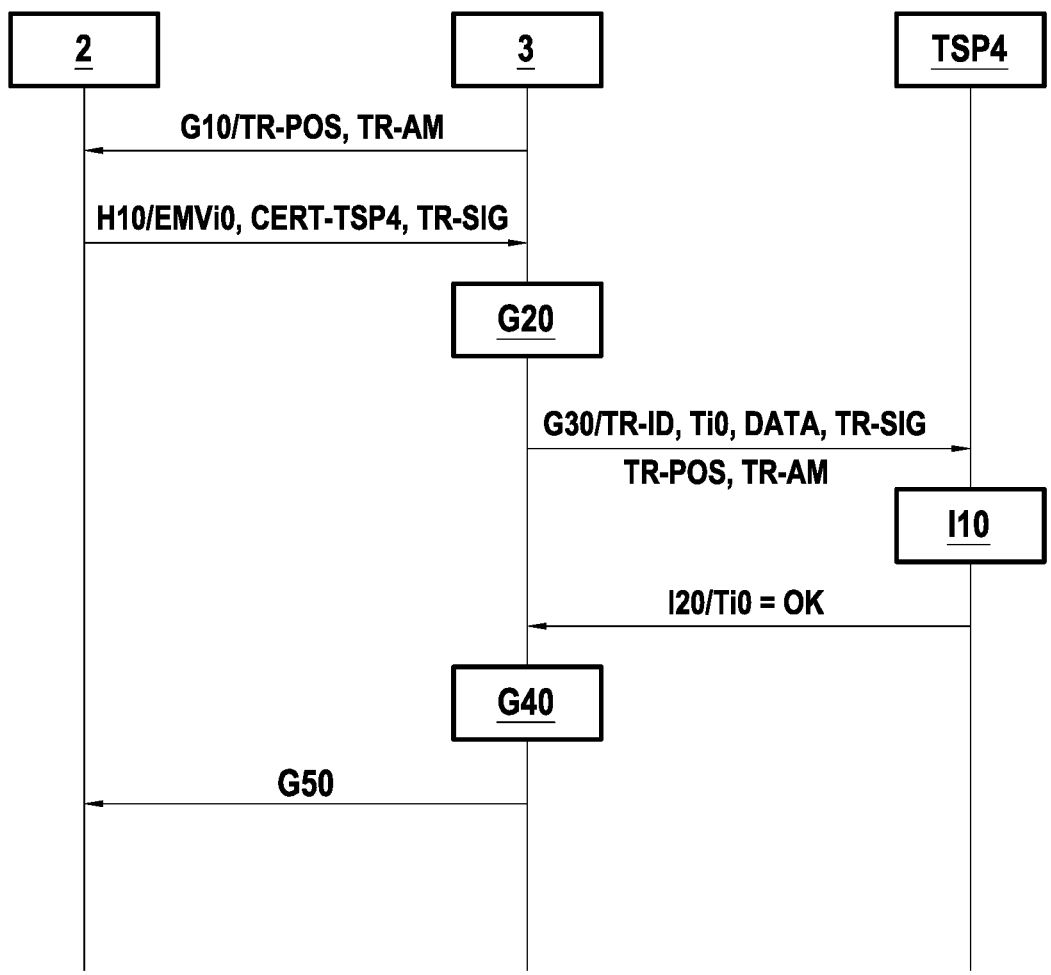
FIG. 6 shows the main steps of a verification method in accordance with the invention as performed by the FIG. 3 token service provider device in a particular implementation.

Thus, with reference to FIGS. 4 and 5, there follows initially a description of the main steps performed for generating security tokens (tokenization). FIG. 4 shows the main steps of a method of obtaining security tokens as performed in a particular implementation within the mobile terminal 2 by the various entities 9, 11, and 12. FIG. 5 shows the main steps of a method of generating security tokens as performed in a particular implementation by the TSP device 4.

It is assumed that, prior to tokenization, the user U is registered with a device 4 providing the tokens (TSP 4) during a preliminary registration stage. During this registration stage the user U both informs the TSP device 4 in particular about sensitive data that the user desires the TSP device 4 to replace with security tokens (bank account or card number in the presently-envisaged example of an electronic transaction), and also receives from the TSP device 4 a user identifier, written TR-ID. the sensitive data supplied by the user U may be stored for example in the non-volatile memory 16 of the TSP device 4 in association with the identifier TR-ID.

Furthermore, it is during this registration stage that the secret keys K-ID and K-PAY are shared between the secure element 9 of the terminal 2 and the TSP device 4. The secret keys K-ID and K-PAY are stored in the mobile terminal 2 in the secure element 9 (step E10) and they are thus made inaccessible, in particular to any application outside the secure element 9. They are stored in the TSP device 4 in association with the identifier TR-ID, e.g. in the non-volatile memory 16.

During this exchange, the TSP device 4 also communicates keys to the mobile terminal 2, both public encryption keys and signature (verification) keys (respectively pkTSP4 and psigkTSP4) corresponding to private (de/en)cryption and signature keys (respectively skTSP4 and ssigkTSP4) used by the TSP device 4 when generating security tokens, as described in greater detail below. By way of example, these keys are stored in the non-volatile memory of the terminal 2. In this application, and for reasons of simplification, the terms "encryption keys" and "signature keys" are used without distinction for specifying the keys both for encrypting and/or decrypting data and the keys both for signing or for verifying a signature. The person skilled in the art will have no difficulty determining which function (encryption or decryption, signing or verifying a signature) is to be performed by the "encryption key" or "signature key" under consideration.

After registration, the terminal 2 acquires security tokens form the TSP device 4 that are for use during electronic transactions as substitutes in this example for bank data of the user U.

In accordance with the invention, prior to sending a request to the TSP device, the terminal 2 uses the application module 12 to request identification of the user U of the terminal 2. For this purpose, the mobile application 12 sends an identification request to the trusted execution environment 11 (referred to below as the TEE 11) (step E20).

On receiving this request, the TEE 11 acts via its identification module 11A to request the user U for identification (step E30). In the presently-described embodiment, the identification module 11A of the TEE 11 requests the user U to provide a PIN code for this purpose. Nevertheless, and as mentioned above, other ways of identifying the user U could be considered in a variant.

It is assumed that the user U supplies the requested PIN code (step E40). The identification module 11A of the TEE 11 verifies the validity of the PIN code (step E50).

If the PIN code supplied by the user U is not correct (possibly after several attempts), the TEE 11 informs the mobile application 12 that identification of the user U has failed. The obtaining method then terminates.

If the user U is identified successfully, the TEE 11 triggers generation by the secure element 9 of identification values for the mobile terminal 2 (step E60). More particularly, the TEE 11 sends a request to the secure element 9 requesting it to generate one or more identification values for the terminal 2.

In the presently-described embodiment, on receiving this request, the secure element 9 acts via its first generator module 9A to generate two identification values by using the secret key K-ID shared with the TSP device 4 (step E70).

For this purpose, it begins by incrementing a count referenced CCH representing in this example the number of requests sent by the mobile terminal 2 for obtaining security tokens. This count acts, so to speak, as a number of a session obtaining tokens by the mobile terminal 2.

Thereafter it generates a hash, written H-ID, by applying a keyed-hash message authentication code (HMAC) function to the count CCH and to the secret key K-ID. No limit is associated with the hashing function used by the secure element 9 in order to generate the hash H-ID. By way of example, it may be a function known as SHA-2, SHA-3, etc. In general manner, in order to perform the invention, it is preferable to select cryptographic hashing functions, key sizes, and encryption and signature algorithms that comply with the security references that are in force such as the reference recommendations of the National Institute of Standards and Technology (NIST)) or of the Agence Nationale de la Sécurité des Systèmes d'Information (ANSSI) [the (French) National agency for security of information systems].

The count CCH and the hash H-ID are two identification values for the mobile terminal 2 in the meaning of the invention. They are transmitted by the secure element 9 to the mobile application 12 (step E80). It should be observed that, advantageously, these identification values are calculated by the secure element 9 only after the user U has been identified and by using the secret key K-ID shared between the secure element 9 and the TSP device 4. In other words, these identification values ensure firstly that the user U of the terminal 2 has been identified successfully by the terminal, and secondly that they have indeed been generated by a terminal 2 that is authorized by and registered with the TSP device 4. The hash H-ID is thus associated with the user and with the request for tokens.

Naturally, the invention is not limited to these two identification values, and other identification values performing the same functions could be envisaged in a variant.

Thereafter, the mobile application 12 uses its send module 12A to send a token generation request to the TSP device 4 (step E100). In this example, this request seeks to obtain a number N of security tokens, where N designates an integer greater than or equal to 1.

In the presently-described embodiment, the request sent to the TSP device 4 is encrypted by the mobile application 12 (step E90). More particularly, the mobile application 12 uses an asymmetric encryption algorithm, e.g. an algorithm of the El Gamal type using the public encryption key pkTSP4 of the TSP device 4 as communicated during the registration stage to encrypt the various data items that are to be transmitted in the token generation request sent to the TSP device 4. In the example presently under consideration, these data items comprise the identifier TR-ID of the user U with the TSP device 4, together with the two identification values CCH and H-ID generated by the secure element 9. Thus, an attacker who has intercepted communications between the mobile terminal 2 and the TSP 4 cannot analyze and make use of the request and the information that it contains.

The identification values and the identifier as encrypted in this way are included in the token generation request that is then sent by the send module 12A of the mobile application 12 to the TSP device 4 (step E100).

With reference to FIG. 5, on receiving the token generation request from the mobile terminal 2 seeking to obtain N security tokens, the TSP device 4 extracts from the request the identification values and the identifier as encrypted in this way, and decrypts this data by means of a decryption algorithm corresponding to the asymmetric encryption algorithm used by the mobile application 12 during step E90 (step F10). For this purpose, it makes use of its private (de/en)cryption key skTSP4 corresponding to the public key pkTSP4 used by the mobile application 12, given that the private key is held only by the TSP device 4.

In the presently-described embodiment, for each user registered with the TSP device 4, the TSP device 4 maintains a count CTSP(TR-ID) that counts the number of requests to generate tokens it has received from that user U. This count is incremented on each token generation request received from the terminal 2. By means of its verification module 4B, the TSP device 4 compares this count CTSP(TR-ID) with the count CCH transmitted in the token generation request and determines whether the two counts match (step F20). The term "match" is used herein to mean equal to within some limit value corresponding to an authorized margin for loss of synchronization between counts (e.g. in order to take account of there being potential problems affecting the network).

Furthermore, the verification module 4B also verifies the validity of the value of the hash H-ID. For this purpose, it applies the same keyed-hash message authentication code HMAC function as was applied by the secure element 9 to the count value CCH and to the secret key K-ID that it shares with the secure element 9. If the hash value obtained in this way corresponds to the value H-ID and the counts CCH and CTSP(TR-ID) match, then the verification module 4B determines that the identification values for the terminal 2 are valid. This guarantees the integrity of the request sent by the mobile terminal.

Otherwise, the TSP device 4 rejects the token generation request from the mobile terminal 2 and terminates the method of generating security tokens.

Valid identification values for the terminal 2 triggers generation by the TSP device 4 of the N security tokens requested by the terminal 2.

More particularly, in the presently-described embodiment, the first generator module 4C of the TSP device 4 generates N security tokens Ti, i=1, . . . , N on the known principles recommended by the EMV® standard and summarized in particular in above-mentioned document D1 (step F30). In the presently-described example, each security token is to take the place of a bank card number of the user (also referred to as a primary account number (PAN)) that is associated with a bank account of the user and that is used by the user for electronic payment.

Thereafter, in the presently-described embodiment, the generator module 4C of the TSP device 4 forms a data packet EMVi for each generated token Ti, i=1, . . . , N, the packet including the token Ti together with the identifier (TR-ID) of the terminal 2 with the TSP device 4, and transaction bank data DATA specific to the user U (i.e. transaction data requested by the bank in order to validate payment but excluding the PAN that has been replaced by the token, this transaction data including in particular the name of the user, the expiry date of the payment means, and where appropriate a security cryptogram protecting it, etc.) and supplied by the user together with the card number PAN during the preliminary stage of registering with the TSP device 4. The data packet EMVi complies with data packets as defined for bank payment by the EMV® standard and as described in particular in the ISO 8583 standard.

The generator module 4C then signs the data packet EMVi as obtained in this way by means of a predetermined signature algorithm (e.g. the known Rivest Shamir Adleman (RSA) algorithm) using the private signature key ssigkTSP4 of the TSP device 4.

For each token Ti that is generated, i=1, . . . , N, the generator module 4C also generates a random number written ai, i=1, . . . , N (step F50). It stores each token Ti together with its associated random number ai in the non-volatile memory 16 of the TSP device 4 in association with the identifier TR-ID of the user U.

Thereafter, the second generator module 4D of the TSP device 4 uses this random number ai and the secret key K-PAY shared with the secure element 9 to calculate an encryption key ki for the token Ti (step F60). In the presently-described embodiment, the encryption key ki is obtained by applying a keyed-hash message authentication code HMAC function to the random number ai and to the secret key K-PAY. It is possible to use the same hashing function as in step E20.

The encryption module 4E of the TSP device 4 then encrypts each security token Ti generated for the mobile terminal 2 by means of a symmetric encryption algorithm by using the encryption key ki as generated for that token (step F70). In the presently-described embodiment, this encryption is performed by applying the symmetric encryption algorithm to the signed data packet EMVi containing the token Ti. This gives rise to an encrypted security token written TOKi. No limitation is associated with the symmetric encryption algorithm used for generating the encrypted security token TOKi. In this example, the encryption module 4D may use a known advanced encryption standard (AES) encryption algorithm.

In the presently-described embodiment, after generating and encrypting the N security tokens requested by the terminal 2, the encryption module 4E of the TSP device 4 signs the N encrypted tokens TOKi and their random numbers ai, i=1, . . . , N by means of a signature algorithm (e.g. the same RSA algorithm as used for signing the packets EMVi) and while using the private signature key ssigkTSP4 of the TSP device 4 (step F80). This results in a signed data set written TOKEN that contains N encrypted security tokens together with their random numbers.

In a variant, the encrypted security tokens TOKi and their random numbers ai may be signed individually during step F80.

Thereafter, the TSP device 4 uses its send module 4F to send the data set TOKEN containing the N signed encrypted security tokens TOKi together with their random numbers ai to the mobile terminal 2 in response to the request to generate tokens as previously sent by the terminal 2 (step F90).

On receiving the response from the TSP device 4 via its first reception module 12B, the mobile application 12 of the terminal 2 verifies the signature of the data set TOKEN by using the public signature (verification) key psigkTSP4 corresponding to the private key ssigkTSP4 of the TSP device 4 (step E110).

If the signature is valid, the mobile application 12 then uses its storage module 12C to store the N encrypted security tokens TOKi and the associated random numbers ai, i=1, . . . , N contained in the set TOKEN in the non-volatile memory 8 of the mobile terminal 2 (step E120). It should be observed that in the presently-described embodiment, the storage module 12C stores the N encrypted security tokens and their random numbers outside the secure element 9.

The N tokens as stored in this way can then be used by the terminal 2 during electronic transactions.

With reference to FIGS. 6 and 7, there follows a description of an example of using a security token as obtained by the mobile terminal 2 during an electronic transaction. By way of illustration, and as mentioned above, it is assumed that the electronic transaction is of the type in which the user U of the mobile terminal 2 purchases an article from the commercial device 3. This electronic transaction comprises an operation of paying for the article purchased by the user U that is performed by the mobile terminal 2 with the commercial device 3 by means of one of the security tokens generated by the TSP device 4.

In the presently-described implementation, the operation of paying for the purchase made by the user U involves the commercial device 3, the mobile terminal 2 and the TSP device 4. Thus, FIG. 6 shows the main steps performed by the commercial device 3 in order to obtain payment for the article purchased by the user 8, and the main steps of the verification method performed by the TSP device 4 in order to validate the token used during this payment by the mobile terminal 2. FIG. 7 shows the main steps of the processing method performed by the mobile terminal 2 and its various entities 9, 11, and 12 in order to make the payment requested by the commercial device 3 by means of a security token generated by the TSP device 4. It should be observed that in compliance with the EMV® standard, other entities may need to intervene during the payment (e.g. a banking organization). Nevertheless, it is assumed that the intervention by such entities complies with the known specifications of the EMV® standard and it is therefore not described in greater detail herein.

With reference to FIG. 6, the commercial device 3 sends to the mobile terminal 2 a request for payment for the purchase made by the user U (step G10). This payment request includes an identifier of the commercial TR_POS together with data characteristic of the transaction, specifically the transaction amount TR_AM. It constitutes a predetermined request coming from a third party device and relating to an economic transaction in the meaning of the invention.

The payment request is received by the mobile application 12 of the terminal, and more particularly by its reception module 12D. It triggers the sending of a user identification request by the reception module 12D to the trusted execution environment TEE 11 (step H10).

On receiving this request, the TEE 11 acts via its identification module 11A to request identification by the user U (step H20). In the presently-described embodiment, the identification module 11A of the TEE 11 requests for this purpose that the user U supply it with a PIN code, as in above-described step E30. Nevertheless, as mentioned above, other ways of identifying the user U could be considered in a variant.

It is assumed that the user U supplies the requested PIN code (step H30). The identification module 11A of the TEE 11 verifies the validity of the PIN code (step H40).

If the PIN code supplied by the user U is not correct (possibly after several attempts), the TEE 11 notifies the mobile application 12 of the failure to identify the user U. The method of processing the payment request then terminates.

If the user U is identified successfully, the TEE 11 triggers selection by the mobile application 12, and more particularly by its selection module 12E, of a security token TOKi0 stored in encrypted form and previously obtained from the TSP device 4 during step F90 (step H50). This selection may be performed in random manner or in the order in which tokens are stored in the volatile memory 16.

The encrypted security token TOKi0 is associated with a random number ai0 that is transmitted by the selection module 12E to the TEE 11 as is the identifier TR-POS of the commercial device 3 and the transaction amount TR-AM received in the payment request (step H60).

Thereafter, the TEE 11 sends a request to the secure element 9 requesting it to generate the encryption key making it possible to decrypt the security token TOKi0 (step H70). This request includes the random number ai0 associated with the selected token, the identifier TR-POS, and the amount TR-AM.

On receiving this request, the secure element 9 acts via its second generator module 9B to generate the encryption key ki0 used for encrypting the security token TOKi0 (step H80). For this purpose, and like the TSP device 4 beforehand, it applies a keyed-hash message authentication code HMAC function (the same as was used by the TSP device 4) to the random number ai0 and to the secret key K-PAY that it shares with the TSP device 4.

In the presently-described embodiment, the generator module 9B also generates a signature element for the electronic transaction being executed. This signature element is generated by applying the keyed-hash message authentication code HMAC function used for generating the encryption key to the identifier TR-POS, to the transaction amount TR-AM, to the random number ai0, and to the secret key K-PAY. The resulting hash is written TR-SIG and constitutes the signature element of the electronic transaction.

Thereafter, the secure element 9 sends the encryption key ki0 as generated in this way and the signature element TR-SIG to the mobile application 12 (step H90).

On receiving the encryption key ki0, the mobile application 12 uses its decryption module 12F to decrypt the security token TOKi0 by using the encryption key ki0 (step H100). For this purpose, it uses the decryption algorithm corresponding to the symmetric encryption algorithm used by the TSP device 4 during step F70 to encrypt the token. In the presently-envisaged example, it is an AES algorithm. At the end of this decryption step, the decryption module 12F obtains the data packet EMVi0 signed by the TSP device 4 and including the security token Ti0 in decrypted form.

It should be observed that in accordance with the invention, decryption of the security token is not necessarily performed by the secure element, but may be performed directly by the mobile application 12.

Thereafter, the mobile application 12 uses its second send module 12G to send a response to the payment request of the commercial device 3 (step H110). This request comprises the signed data packet EMVi0 containing the security token Ti0 of the mobile terminal 2 accompanied by a certificate CERT-TSP4 of the public signature key of the TSP device 4 delivered thereto by a trusted authority (e.g. as specified by the EMV-SDA protocol), and the signature element TR-SIG. It is assumed that the certificate CERT-TSP4 was obtained by the mobile terminal 2 during the initial stage of registering with the TSP device 4.

With reference once more to FIG. 6, on receiving the response from the mobile terminal 2, the commercial device 3 verifies the certificate and also the signature of the signed data packet EMVi by using the public signature (verification) key psigkTSP4 of the TSP device 4 (step G20). From the data packet EMVi, it extracts the identifier TR-ID of the terminal 2, the security token Ti0, and the transaction data DATA specific to the user U.

Thereafter, the commercial device 3 sends a detokenization request to the TSP device 4 seeking to verify the validity of the token Ti0 supplied by the mobile terminal 2. This request comprises the identifier TR-ID of the terminal 2, the security token Ti0, the transaction data DATA previously extracted from the packet EMVi, and the signature element TR-ID of the transaction (step G30). It also includes in this request its own identifier TR-POS together with the transaction amount TR-AM.

On receiving the detokenization request from the commercial device 3 via its reception module 4G, the TSP device 4 uses its verification module 4H to verify that the security token Ti0 does indeed correspond to a security token that it has generated for the mobile terminal 2, in other words that is associated in its own memory with the identifier TR-ID (step I10).

Where appropriate, it also verifies the validity of the signature element TR-ID. For this purpose, it uses the keyed-hash message authentication code HMAC function to generate a hash by applying this function to the identifier TR-POS, to the amount TR-AM, to the random number ai0 associated with the token Ti0 in its non-volatile memory, and to the secret key K-PAY that it shares with the secure element 9. It compares the resulting hash with the signature element TR-ID. If they are both equal, the signature element TR-ID is recognized as being valid.

If the verification module 4H of the TSP device 4 determines that the security token Ti0 was indeed generated by itself for the mobile terminal 2 and that the signature element TR-ID is valid, it confirms to the commercial device 3 the validity of the token used by the mobile terminal 2 for payment of the transaction (step I20). Otherwise, it notifies the commercial device 3 that the token used by the mobile terminal 2 is not valid.

In accordance with the specifications of the EMV® protocol, the TSP device 4 can also carry out other operations, in particular with the banking organization of the user U making it possible to continue with payment of the purchase made by the user U, e.g. on the basis of the card number PAN corresponding to the valid token. Since these operations are themselves known and similar to those performed for a conventional bank card payment with a payment terminal, they are not described in detail herein. They are described in detail in book 2 of the specifications for payment systems of the EMV® protocol entitled "Security and key management".

On receiving confirmation from the TSP device 4, the commercial device 3 deletes the security token Ti0 (step G40). It also sends confirmation that payment has been accepted to the mobile terminal 2 (step G50).

On receiving this confirmation, the mobile terminal 2 takes the security token Ti0 and its associated random number out of service (step H120). In the presently-described embodiment, this consists in deleting the security token Ti0 together with its random number ai0 in the non-volatile memory of the terminal 2, in other words deleting the packet EMVi0.

The electronic transaction comprising payment for the purchase made by the user U then terminates.

The invention claimed is:

1. A method implemented by a mobile terminal of a user, the method comprising obtaining at least one security token for use during an electronic transaction, wherein obtaining at least one security token comprises:
   verifying an identity of the user of the mobile terminal;
   generating, triggered by successful verification of the identity of the user, by a secure element of the mobile terminal, at least one identification value for the mobile terminal by using a first secret key shared between the secure element and a security token service provider device;
   sending a request to the security token service provider device to obtain at least one security token for use by the mobile terminal during an electronic transaction, the request including the generated at least one identification value of the mobile terminal; and
   receiving from the security token service provider device the at least one security token encrypted using a symmetric encryption algorithm, each security token being uniquely associated with a random number generated by the security token service provider device for the respective security token, different security tokens generated by the security token service provider device being respectively associated with different random numbers, and each security token being encrypted using an encryption key generated for the respective security token from the random number associated with the respective security token and from a second secret key shared between the security token service provider device and the secure element of the mobile terminal, the method further comprising enabling the mobile terminal to process a request relating to an electronic transaction, wherein enabling the user mobile terminal to process the request comprises:
   verifying, triggered upon receiving a predetermined request coming from a third-party device and relating to an electronic transaction, an identity of the user of the mobile terminal;
   selecting, triggered by successful verification of the identity of the user, a security token from the at least one encrypted security token stored in the mobile terminal and obtained from the security token service provider device, the selected security token being associated with a random number;
   generating by the secure element of the mobile terminal for the selected security token an encryption key from the random number associated with the selected security token and from the second secret key shared between the token service provider device and the secure element, and used during the obtaining method;
   decrypting the selected security token by use of the encryption key that has been generated; and
   sending a response including the decrypted security token to the request from the third-party device.

2. The method according to claim 1, wherein the at least one identification value generated by the secure element comprises:
   a count maintained by the secure element and corresponding to the number of requests to obtain at least one security token that have been sent by the terminal to the security token service provider device; and
   a hash generated by applying a hashing function to the count and to the first secret key.

3. The method according to claim 1, wherein the at least one encrypted security token and the associated random number are stored in the mobile terminal outside the secure element.

4. The method according to claim 1, wherein during the generating of the encryption key, the secure element of the mobile terminal also generates a signature element for the electronic transaction from an identifier of the third-party device, from data characteristic of the transaction as supplied by the third-party device, from the random number associated with the security token, and from the second secret key, the signature element for the transaction being transmitted to the third-party device in the response to the request.

5. A method implemented by a security token service provider device, the method comprising generating multiple security tokens that are to be used by a mobile terminal during electronic transactions, wherein generating the multiple security tokens comprises:
   receiving from the mobile terminal at least one request to obtain multiple security tokens for use by the mobile terminal during electronic transactions, the at least one request including at least one identification value for the mobile terminal as generated by the secure element of the mobile terminal by using a first secret key shared between the secure element and the security token provider;
   verifying the at least one identification value by use of the first secret key;
   generating, triggered by successful verification of the at least one identification value, for the mobile terminal, the multiple security tokens and random numbers associated with the multiple security tokens, different security tokens generated by the security token service provider device being respectively associated with different random numbers;
   generating, for each security token, an encryption key from the random number uniquely associated with the respective security token and from a second secret key shared between the security token service provider device and the secure element of the mobile terminal;

encrypting each security token by using a symmetric encryption algorithm and the encryption key generated for the respective security token; and sending the multiple encrypted security tokens and the associated random numbers to the mobile terminal.

6. The method according to claim 5 comprising verifying the security token supplied by a user mobile terminal to a third-party device during an electronic transaction, wherein verifying the security token comprises:

receiving a verification request including the security token from the third-party device; and verifying that the security token included in the request was indeed generated by the security token service provider device for the mobile terminal.

7. The method according to claim 6, further comprising validating a signature element for the transaction included in the verification request, the signature element being generated from an identifier of the third-party device, from data characteristic of the transaction, from the random number associated with the security token, and from the second secret key used during the generation method and shared between the secure element of the mobile terminal and the security token service provider device.

8. A mobile terminal, having a processor and software including modules, comprising:

a secure element;

an identification module configured to verify an identity of a user of the mobile terminal;

a first generator module included in the secure element and activated upon successful verification of the identity of the user by the identification module, the first generator module being configured to generate at least one identification value for the mobile terminal by using a first secret key shared between the secure element and a security token service provider device;

a first send module configured to send a request to the security token service provider device to obtain at least one security token for use by the mobile terminal during an electronic transaction, the request including the generated at least one identification value for the mobile terminal; and a reception module arranged to receive from the security token service provider device the at least one security token encrypted using a symmetric encryption algorithm, each security token being uniquely associated with a random number generated by the security token service provider device for the respective security token, different security tokens generated by the security token service provider device being respectively associated with different random numbers, and each security token encrypted by use of an encryption key generated for the respective security token from the random number associated with the respective security token and from a second secret key shared between the token service provider device and the secure element of the mobile terminal, wherein the identification module is also activated upon receiving a predetermined request coming from a third-party device and relating to an electronic transaction, the mobile terminal further comprising:

a selection module, activated upon successful verification of the identity of the user by the identification module, that is configured to select a security token from among the at least one encrypted security token stored in the mobile terminal by the storage module;

a second generator module included in the secure element of the mobile terminal and configured to generate an encryption key for the selected security token from the random number associated with the selected security token and from the second secret key shared between the security token service provider device and the secure element;

a decryption module configured to decrypt the selected security token by use of the encryption key that has been generated; and a second send module configured to send a response including the decrypted security token to the request from the third-party device.

9. A security token service provider device for use in electronic transactions, the device comprising:

a processor and a memory arranged to execute software modules;

a first reception module arranged to receive from a mobile terminal at least one request to obtain multiple security tokens for use by the mobile terminal during electronic transactions, the at least one request including at least one identification value for the mobile terminal as generated by a secure element of the mobile terminal by using a first secret key shared between the secure element and the token service provider device;

a first verification module configured to verify the at least one identification value by use of the first secret key;

a first generator module that is activated upon successful verification of the at least one identification value by the first verification module is valid and that is configured for generating one multiple security tokens and random numbers uniquely associated with the multiple security tokens for the mobile terminal, different security tokens generated by the security token service provider device being respectively associated with different random numbers;

a second generator module configured to generate, for each security token as generated by the first generator module, an encryption key for from the random number associated with the respective security token and from a second secret key shared between the security token service provider device and the secure element of the mobile terminal;

an encryption module configured to encrypt each security token by using a symmetric encryption algorithm and the encryption key generated for the respective security token; and a send module configured to send the multiple encrypted security tokens and the associated random numbers to the mobile terminal.

10. A system comprising:

a security token service provider device for use in electronic transactions;

a mobile terminal; and a third-party device arranged to perform an electronic transaction with the mobile terminal;

the security token service provider device comprising a processor and a memory arranged to execute software modules, the security token service provider device comprising;

a first reception module arranged to receive from the mobile terminal a request to obtain at least one security token for use by the mobile terminal during an electronic transaction, the request including at least one identification value for the mobile terminal as generated by a secure element of the mobile terminal by using a first secret key shared between the secure element and the security token service provider device;

a first verification module configured to verify the at least one identification value by use of the first secret key;

a first generator module that is activated if the at least one identification value verified by the first verification module is valid and that is configured for generating at least one security token and a random number uniquely associated with the at least one security token for the mobile terminal, different security tokens generated by the security token service provider device being respectively associated with different random numbers;

a second generator module configured to generate, for each security token as generated by the first generator module, an encryption key from the random number associated with the respective security token and from a second secret key shared between the security token service provider device and the secure element of the mobile terminal;

an encryption module configured to encrypt each security token by using a symmetric encryption algorithm and the encryption key generated for the respective security token; and a send module configured to send the at least one encrypted security token and the associated random number to the mobile terminal;

the mobile terminal having a processor and software including modules, the mobile terminal comprising:

the secure element;

an identification module configured to verify an identity of a user of the mobile terminal, wherein the identification module is also activated upon receiving a predetermined request coming from the third-party device and relating to an electronic transaction;

a first terminal generator module included in the secure element and activated upon successful verification of the identity of user by the identification module, the first generator module being configured to generate at least one identification value for the mobile terminal by using the first secret key shared between the secure element and the security token service provider device;

a first terminal send module configured to send the request to the security token service provider device to obtain at least one security token for use by the mobile terminal during an electronic transaction, the request including the generated at least one identification value for the mobile terminal;

a terminal reception module arranged to receive from the security token service provider device the at least one security token encrypted using a symmetric encryption algorithm, each security token being uniquely associated with a random number generated by the security token service provider device for the respective security token, different security tokens generated by the security token service provider device being respectively associated with different random numbers, and each security token encrypted by use of an encryption key generated for the respective security token from the random number associated with the respective security token and from the second secret key shared between the token service provider device and the secure element of the mobile terminal;

a selection module, activated upon successful verification of the identity of the user by the identification module, that is configured to select a security token from among the at least one encrypted security token stored in the mobile terminal by the storage module;

a second terminal generator module included in the secure element of the mobile terminal and configured to generate an encryption key for the selected security token from the random number associated with the selected security token and from the second secret key shared between the security token service provider device and the secure element;

a decryption module configured to decrypt the selected security token by use of the encryption key that has been generated; and a second terminal send module configured to send a response including the decrypted security token to the request from the third-party device; and the mobile terminal being configured to make use, during the electronic transaction with the third-party device, of a security token generated by the token service provider device.

* * * * *